March 29, 1955 R. P. SAAR 2,705,016
BUTTERFLY VALVE
Filed Oct. 28, 1952
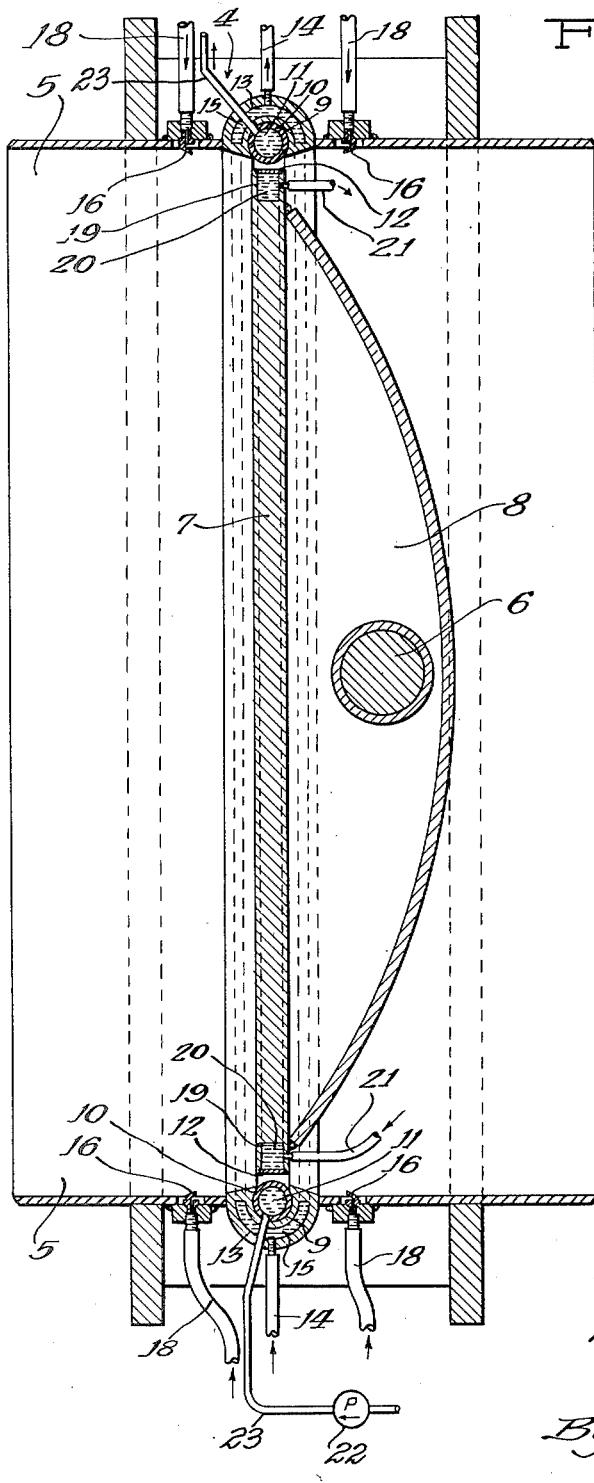
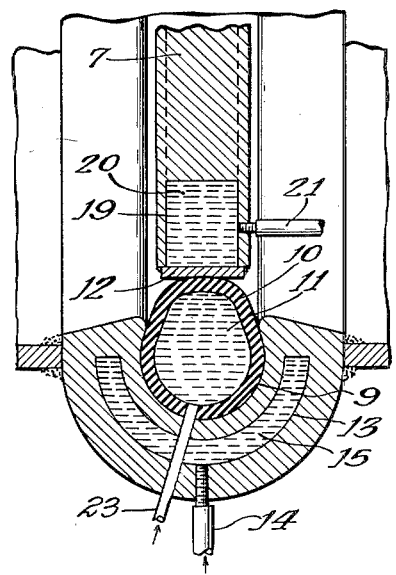
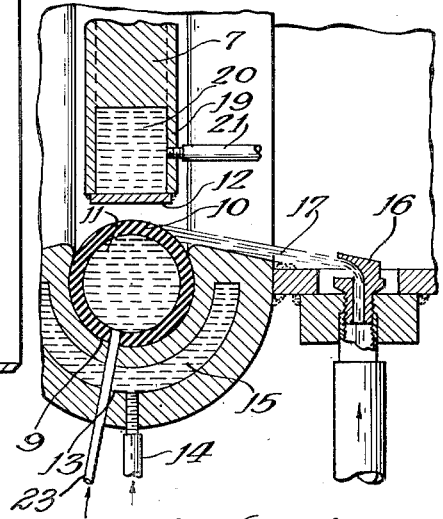
Inventor:
Robert P. Saar
By: Schroeder, Merriam,
Hofgren & Brady
Attorneys United States Patent Office 2,705,016
Patented Mar. 29, 1955

2,705,016

BUTTERFLY VALVE

Robert P. Saar, Downers Grove, Ill., assignor to Henry Pratt Company, a corporation of Illinois Application October 28, 1952, Serial No. 317,304

6 Claims. (Cl. 137—1)

This invention relates to butterfly valves adapted to operate at severe temperature conditions and more particularly to a resilient seat or tube through which a temperature-controlling liquid may be circulated to expand the seat and tightly seal the valve.

The primary object of the invention is to provide a butterfly valve in which the edge of the valve disk and the seat in the valve casing may be tightly sealed when the valve is in closed position. The butterfly valves may be large, such as 5 feet in diameter with an area in excess of 20 square feet. The valves may be used in wind tunnels for experimental purposes on jet engines and the like. In such work a tight seal must be maintained within the valve through great extremes of temperature ranging from −20° F. to as high as 700° F. In addition, the valves must be able to withstand high pressures without leaking; for example, the pressure on the valve face is often as much as 75 lbs. per square inch.

In previous valves used for these purposes it had been necessary to machine the valve disk closing the opening and the metal seat for it in the valve casing to a very close tolerance.

One of the objects of the present invention is to overcome these difficulties by providing a less costly expansible resilient tube which serves as an effective seal in spite of the great variances in temperature and pressure.

Another object is to provide temperature-controlling means whereby the resilient tube-forming seal is prevented from burning. The importance of such means is readily seen since a synthetic or silicon rubber may be used as a seat, and it is exposed to an otherwise destructive temperature.

Still another object is to control the temperature of the resilient tube to prevent it from acquiring a permanent set.

The invention is illustrated in a preferred embodiment in the accompanying drawings, in which:

Fig. 1 is a sectional side elevational view of the butterfly valve in closed position;

Fig. 2 is an enlarged fragmentary view of a portion of Fig. 1, showing the expanded resilient tube; and Fig. 3 is an enlarged fragmentary view of a portion of Fig. 1, showing the resilient tube before inflation.

In the embodiment illustrated, a valve casing 4 encloses conduit 5. A shaft 6 carries a valve disk 7 and is journaled in the casing 4. The shaft 6 can be turned so that the valve disk 7 is positioned across the conduit 5 within casing 4, as shown in Fig. 1. Preferably the valve disk 7 is a plate-like object, having a dome-shaped rear plate 8, to withstand high pressure on its front face.

Within the casing 4 there is an annular groove 9 seating a tube 10 made of a resilient material such as synthetic rubber having a high silicon content. A liquid 11 is circulated under pressure within the tube. The temperature and pressure of the liquid, and the rapidity of its circulation are controlled to maintain the tube at a proper temperature. Conventional means, such as a pump 22, may be used to circulate the liquid 11 through the tube 10, and connections 23 are provided to carry the liquid to, and away from, the interior of the tube 10. In most uses, the temperature is high and the tube must be cooled, but if the valve is being used at very low temperatures, the circulating liquid may be heated to protect the rubber of the tube.

The tube 10 is seated well within the groove 9, as best seen in Fig. 3. When pressure is applied to the liquid within the tube, the tube will expand inwardly against the outer rim 12 of valve disk 7, as shown in Fig. 2. In its expanded condition a portion of the rubber of tube 10 is exposed to pressure from within the conduit 5. This pressure may reach 75 lbs. per square inch and tends to push the tube from its seat. However, a pressure of 125 lbs. per square inch in the tube is sufficient to maintain the seal and hold the tube in its seat.

Under severe temperature conditions additional safeguards for the protection of the tube may be acquired. A jacket 13 is shown in the casing 4 about the annular groove 9. This jacket is provided with connections 14, to circulate temperature-controlling liquid 15 within the jacket and to cool or heat the groove 9 and the tube 10 as desired.

Also, spray nozzles 16 are shown provided at regularly spaced intervals within the casing, on both sides of the annular groove, to direct a spray of liquid 17 upon the exposed portions of the tube, as shown in Fig. 3. Connections 18 carry the liquid to the nozzles under suitable pressure from a source not shown.

The valve disk 7 preferably contains in its outer edge a closed channel 19. Liquid 20 is carried to and away from this channel by connections 21. This circulation controls the temperature of the outer rim 12 of the valve disk. This in turn helps control the temperature of the expanded rubber tube 10 with which the rim is in contact.

The foregoing detailed description is given for clearness of understanding only, and no unnecessary limitations should be understood therefrom, for some modifications will be obvious to those skilled in the art.

I claim:

1. A butterfly valve comprising: a casing having an inner annular groove; a resilient seat-forming tube in said groove; a shaft journaled in the casing and carrying a valve disk adapted to be turned into alignment with said tube; inlet and outlet liquid connections with the tube; and means circulating liquid through said tube to control its temperature, and with sufficient pressure to expand the tube into sealing engagement with the outer rim of said valve disk.

2. A valve as specified in claim 1 in which a cooling jacket is provided about the tube-holding groove, and connections are provided for circulating temperature-controlling liquid through said jacket.

3. A valve as specified in claim 1 in which spray nozzles are provided in the casing for directing cooling liquid against the resilient tube, said nozzle being connected to a source of liquid under pressure.

4. A valve as specified in claim 1 in which the valve disk has a closed annular channel adjacent to its outer edge, and connections are provided for circulating a liquid through said channel to cool the edge of said disk.

5. A valve as specified in claim 1 in which a cooling jacket is provided about the tube-holding groove, said packet having connections for circulating temperature-controlling liquid through the jacket, spray nozzles are provided in the casing for directing cooling liquid against the resilient tube, said nozzles being connected to a source of liquid under pressure, and the valve disk is provided with a closed annular channel adjacent to its outer edge, said channel having connections for circulating cooling liquid through said channel to cool the edge of said disk.

6. The method of releasably sealing the disk of a butterfly valve against a resilient seat-forming tube, which comprises: turning the valve disk into alignment with the tube; introducing temperature-controlling liquid into said tube a sufficient pressure to expand it against the disk; and circulating said temperature-controlling liquid through said tube at sufficient pressure to maintain the tube in sealing engagement with the disk.

References Cited in the file of this patent

UNITED STATES PATENTS

| | | |
|---|---|---|
| 1,219,501 | Stevens | Mar. 20, 1917 |
| 1,731,222 | Blair | Oct. 8, 1929 |
| 1,742,959 | King | Jan. 7, 1930 |
| 1,813,126 | Sheppard | July 7, 1931 |
| 2,446,196 | Sitney | Aug. 3, 1948 |